(12) United States Patent
Mansell et al.

(10) Patent No.: US 7,770,110 B1
(45) Date of Patent: Aug. 3, 2010

(54) SYSTEM AND METHOD FOR TRANSFORMING AN XML FILE INTO AN ADD-IN FUNCTION FOR IMPLEMENTATION INTO A SPREADSHEET APPLICATION

(75) Inventors: Howard Christopher Mansell, Brooklyn, NY (US); Neville Dwyer, Stowe, VT (US); Daniel Gregory Brown, Rye, NY (US)

(73) Assignee: Credit Suisse Securities (USA) LLC, New York, NY (US)

( * ) Notice: Subject to any disclaimer, the term of this patent is extended or adjusted under 35 U.S.C. 154(b) by 908 days.

(21) Appl. No.: 11/635,881

(22) Filed: Dec. 7, 2006

Related U.S. Application Data

(60) Provisional application No. 60/792,480, filed on Apr. 17, 2006.

(51) Int. Cl.
*G06F 17/00* (2006.01)

(52) U.S. Cl. ...................................... 715/249; 715/239

(58) Field of Classification Search .................. 715/234, 715/235, 236, 237, 239, 242, 255, 249, 209; 707/E17.123, E17.124, E17.126
See application file for complete search history.

(56) References Cited

U.S. PATENT DOCUMENTS

| | | | | |
|---|---|---|---|---|
| 6,370,561 B1 * | 4/2002 | Allard et al. | ................ | 709/203 |
| 6,647,410 B1 * | 11/2003 | Scimone et al. | ............ | 709/206 |
| 7,174,327 B2 * | 2/2007 | Chau et al. | ......................... | 1/1 |
| 7,254,581 B2 * | 8/2007 | Johnson et al. | ..................... | 1/1 |
| 7,266,763 B2 * | 9/2007 | Peyton-Jones et al. | ...... | 715/213 |
| 7,546,602 B2 * | 6/2009 | Hejlsberg et al. | ........... | 719/313 |
| 2002/0169658 A1 * | 11/2002 | Adler | ......................... | 705/10 |
| 2005/0223392 A1 * | 10/2005 | Cox et al. | .................... | 719/328 |
| 2006/0053363 A1 * | 3/2006 | Bargh et al. | ................. | 715/503 |
| 2006/0212474 A1 * | 9/2006 | McCormack et al. | ..... | 707/103 Z |
| 2008/0015882 A1 * | 1/2008 | Frederick | ....................... | 705/1 |

OTHER PUBLICATIONS

"Deployment and Configuration of Component-Based Distributed Applications Specification", Object Management Group, Inc, Jun. 2003, pp. 1-196.*

* cited by examiner

*Primary Examiner*—Laurie Ries
(74) *Attorney, Agent, or Firm*—King & Spalding LLP

(57) ABSTRACT

The XML conversion system provides methods and architecture for defining an interface between a spreadsheet application and a COM server independent of the areas that the interface is defined. In support of defining the interface, an add-in function defines the interface using extensible markup language ("XML"). An add-in XML file is scanned for instructions. An instruction is analyzed to determine the interface it will expose. An interface XML file having a function specification can be retrieved from a COM server based on the interface exposed in the instruction. Function qualifiers are taken from the instruction and applied to the function specification. The function specification is converted to an intermediate function and implementation specifiers are applied to the intermediate function. The intermediate function is then converted to an add-in function and applied in the spreadsheet application.

24 Claims, 6 Drawing Sheets

SYSTEM AND METHOD FOR TRANSFORMING AN XML FILE INTO AN ADD-IN FUNCTION FOR IMPLEMENTATION INTO A SPREADSHEET APPLICATION

STATEMENT OF RELATED PATENT APPLICATION

This non-provisional patent application claims priority under 35 U.S.C. §119 to U.S. Provisional Patent Application No. 60/792,480, titled System and Method for Transforming an XML File into an Add-In Function for Implementation Into a Spreadsheet Application, filed Apr. 17, 2006. This provisional application is hereby fully incorporated herein by reference.

FIELD OF THE INVENTION

The present invention relates to the field of computer-implemented spreadsheet applications. In particular, the invention provides a computer-based system and method of converting XML to an interface definition language to define an interface in a COM server.

BACKGROUND OF THE INVENTION

Computerized spreadsheet applications, such as Microsoft Corporation's EXCEL software product have gained widespread use. Individuals and businesses routinely use computerized spreadsheets for a variety of purposes, such as accounting, finance, and investments.

Over the years, the functionality made available to users of these spreadsheet applications has grown significantly. Users of these applications are now able to implement functionality or import data embedded in areas outside the spreadsheet application in order to satisfy the needs of the user. One objective of today's users is to implement analytical functionality stored in a Component Object Model ("COM") server from the spreadsheet application.

Unfortunately, current methods of implementing the functionality in the COM server can be time and coding intensive. First, a user or developer is not able to call the COM server directly from the spreadsheet application. The developer is typically required to build an additional layer, or wrapper, around the COM server in order to translate the functionality from the COM server to the spreadsheet application. Currently there are several conventional methods for building the additional layer to translate the functionality from the COM server to the spreadsheet application. One conventional method includes writing the COM server. Next, the developer defines the interface of the COM server using standard computing toolsets provided by Microsoft Corporation. Next, the code for the function is implemented. Finally, the developer writes a dynamic link library defining attributes of the function. In addition, the developer will have to manually write the mapping layer that translates the differences between the COM server and the spreadsheet application.

When writing the COM server, the developer will be required to define an interface to the COM server. The COM server typically includes one or more COM classes. Each COM class can contain one or more methods. For each method associated with a COM class in the COM server, the developer wants to include a corresponding function to the add-in function.

Methods associated with each COM class are typically complex to understand for the everyday user of the spreadsheet application. Each method typically includes documentation. The documentation provides information as to what an input will do in a method, what restrictions are placed on a method, under what conditions the method will respond, whether the method will converge, etc. The documentation needs to be stored in a place that is documented for COM servers, for users using the COM servers, and with add-in functions, for people using add-in functions, so that there is consistency between the COM server and the add-in server.

Problems arise because the toolsets provided for building COM servers are too basic. If a developer wants to add a method or argument to a COM server during development of the COM server, the developer has to made manual changes in several different places for each addition. For example, first, the developer will have to change the interface definition language ("IDL"). The Microsoft Interface Definition Language ("MIDL") is one example of an IDL. The MIDL is a standard way for defining COM interfaces. To change portions of the IDL the developer would need to modify some aspects of the implementation of the COM server.

In addition, the header file of the class definition and the class definition itself would have to be modified in order to change the definition of the function or add the definition of the function to the COM server. Furthermore, in the add-in, the developer would need to add a new function and write addition-specific code that translates the function from the spreadsheet to the COM server.

In view of the foregoing there is a need in the art for a method to allow a spreadsheet application user to define the interface between the spreadsheet application and the COM server independent of all places the interface is defined so that when implemented, the interface automatically inserts the information that a developer previously had to insert manually into each portion of the COM and add-in servers, so that a function in a COM server can be directly accessed from the spreadsheet application.

SUMMARY OF THE INVENTION

The XML conversion system provides methods and architecture for defining an interface between a spreadsheet application and a COM server independent of the areas that the interface is defined. In support of defining the interface, an add-in function defines the interface using extensible markup language ("XML"). An add-in function typically provides additional functionality to a spreadsheet application. Add-in functions can also be called plug-ins or add-ons. In one exemplary embodiment, add-in functions can be added to a spreadsheet application through the use of an add-in manager or wizard that provides users a step-by-step process for inserting the add-in or making it available to the spreadsheet application. In one exemplary embodiment, the XML file defines the interface for the add-in function.

One or more instructions within the add-in XML file can be analyzed by a COM server to determine if the add-in XML file contains instructions to expose an interface. If the add-in XML file contains instructions to expose an interface, the COM server can determine if an XML file for that interface exists in the COM server. The COM server may then begin building the add-in function by retrieving the function specifications from the interface that will be exposed. Each function specification can include the name of the function, the function type, data types of the function, a description of what the function can and cannot do, and one or more arguments.

The instruction in the XML file can then be analyzed to determine if it contains function qualifiers. Function qualifiers are typically instructions that can modify the function specification or modify the processing of the function specification. For example, function qualifiers can include instructions that rename the function specification. In addition, function qualifiers can include instructions to ignore the function specification and exclude it from the output of the add-in function. If the instruction contains function qualifiers for the particular function specification, the function qualifiers can be applied to the function specification and the function specification can be converted to an intermediate function.

The intermediate function is typically a middle processing step between the function specification and the add-in function that includes a form for receiving information from the function specification, the interface and the instruction from the add-in XML file. Implementation specifiers can be added to the intermediate function by the COM server and can be located in the add-in XML file. The implementation specifier typically provides an instruction in the add-in XML file to override the implementation type for an interface. In one exemplary embodiment implementation specifiers include, but are not limited to, "clone and modify," "create and define," "create and call," and "method call". Upon completion of the addition of the implementation specifiers, the intermediate function is converted into an add-in function and sent to the spreadsheet application for processing in a manner similar to other add-in functions in the spreadsheet application.

BRIEF DESCRIPTION OF DRAWINGS

For a more complete understanding of exemplary embodiments of the present invention and the advantages thereof, reference is now made to the following description in conjunction with the accompanying drawings in which.

Figure 1:
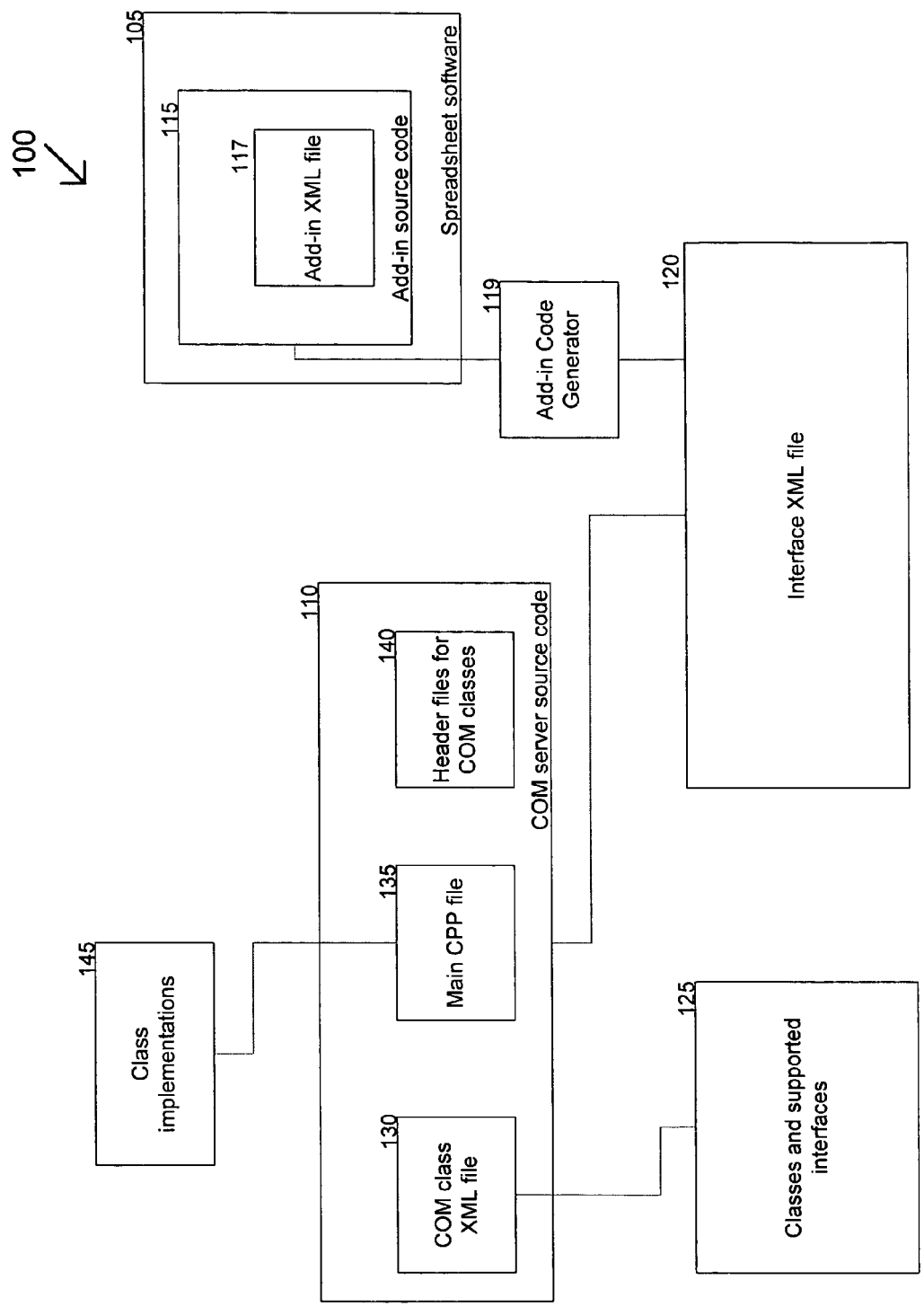
FIG. 1 is a block diagram illustrating an exemplary operating environment for implementation of various embodiments of the present invention.

DETAILED DESCRIPTION OF THE
EXEMPLARY EMBODIMENTS

The present invention supports computer-implemented methods and architecture for defining an interface between a spreadsheet application and a COM server independent of the areas that the interface is defined. Exemplary embodiments of the invention can be more readily understood by reference to the accompanying figures.

Although exemplary embodiments of the present invention will be generally described in the context of a software module and an operating system running on a personal computer, those skilled in the art will recognize that the present invention can also be implemented in conjunction with other program modules for other types of computers. Furthermore, those skilled in the art will recognize that the present invention may be implemented in a stand-alone or in a distributed computing system environment. In a distributed computing environment, program modules may be physically located in different local and remote memory storage devices. Execution of the program modules may occur locally in a stand-alone manner or remotely in a client/server manner. Examples of such distributed computing environments include local area networks, enterprise-wide computer networks, and the global Internet.

The detailed description that follows is represented largely in terms of processes and symbolic representations of operations by conventional computer components, including processing units, memory storage devices, display devices, and input devices. These processes and operations may utilize conventional computer components in a distributed computing environment.

The processes and operations performed by the computer include the manipulation of signals by a processing unit or remote computer and the maintenance of these signals within data structures resident in one or more of the local or remote memory storage devices. Such data structures impose a physical organization upon the collection of data stored within a memory storage device and represents specific electrical and magnetic elements. These symbolic representations are the means used by those skilled in the art of computer programming and computer construction to most effectively convey teachings and discoveries to others skilled in the art.

Exemplary embodiments of the present invention include a computer program that embodies the functions described herein and illustrated in the appended flowcharts. However, it should be apparent that there could be many different ways of implementing the invention in computer programming, and the invention should not be construed as limited to any one set of computer program instructions. Furthermore, a skilled programmer would be able to write such a computer program to implement a disclosed embodiment of the present invention without difficulty based, for example, on the flowcharts and associated description of the application text. Therefore, disclosure of a particular set of program code instructions is not considered necessary for an adequate understanding of how to make and use the present invention. The inventive functionality of the computer program will be explained in more detail in the following description and is disclosed in conjunction with the remaining figures illustrating the program flow.

Referring now to the drawings in which like numerals represent like elements throughout the several figures, aspects of the present invention and an exemplary operating environment for the implementation of the present invention will be described.

FIG. 1 is a block diagram illustrating an XML conversion system 100 constructed in accordance with an exemplary embodiment of the present invention. The exemplary system 100 comprises a spreadsheet application 105, COM server source code 110, add-in source code 115, add-in code generator 119, classes and supported interfaces 125, and class implementations 145. The spreadsheet application 105 is communicably attached to the COM server source code 110, add-in code generator 119, interface XML file 120 and class implementations 145, however, those of ordinary skill in the art will recognize that the spreadsheet application 105 could also be communicably attached to these other elements via a distributed computer network. In one exemplary embodiment, the spreadsheet application 105 is Microsoft EXCEL, however other spreadsheet applications 105 may be substituted in the invention. The spreadsheet application 105 can include add-in source code 115 and an add-in XML file 117.

The COM server source code 110 is communicably attached to the interface XML file 120, the classes and supported interfaces 125 and the class implementations 145. In one exemplary embodiment, the COM server source code 110 is a COM-compliant software component. A COM server source code 110 is binary (compiled) code that contains object definitions, called classes, from which objects can be instantiated at run time. COM server source codes 110 are packaged and distributed to Windows computers as .dll or .exe files.

The COM server source code 110 includes a COM class XML file 130, a main CPP file 135 and header files for COM classes 140. The COM class XML file 130 is a file that typically includes instructions describing which classes will be added and the interfaces supported by each class within the XML file. The main CPP file 135 typically includes boiler plate code This boiler plate code is used as a reference from the COM class XML file 130 to each of the interfaces supported by the COM class XML file 130. In one exemplary embodiment, the main CPP file 135 is intended to be compiled once for any given build of a function. Typically, each class or group of utility functions will have their definitions in a separate CPP file 135.

The COM class XML file 130 also generates the header files for COM classes 140. A header file is a text file containing small bits of program code that is used to describe the contents of the main body of code to other modules. In one exemplary embodiment, the header files for COM classes 140 specify only interfaces, while implementations are stored in the COM server source code 110.

The add-in source code 115 includes an add-in XML file 117. The add-in source code 115 is communicably attached to the add in code generator 119 and the interface XML file 120. The add-in source code 115 provides one or more add-in XML files, each having different names. The add-in source code 115 retrieves the named add-in XML file and exposes its interface. By doing so, the add-in source code 115 generates the necessary add-in implementations needed by retrieving the definitions of all the interfaces, the functions, the parameters of those functions and all the documentation so that the add-in source code 115 can generate the whole of that implementation as an add-in XML file 117.

The add-in code generator 119 is communicably attached to the add-in source code 117 and the interface XML file 120. The add-in code generator 119 generates the add-in function from the XML interface. The interface XML file 120 is communicably attached to the add-in source code 115, and the COM server source code 110 inside the spreadsheet application 105. The interface XML file 120 includes a definition of the interface written in XML code. The interface XML file 120 also includes one or more functions for each interface, the arguments for each of those functions, and a summary and description for each of the arguments.

The classes and supported interfaces 125 is communicably attached to the COM class XML file. The classes and supported interfaces module 125 typically includes template definitions of the methods and variables for COM objects, also known as the class hierarchy. The classes and supported interfaces 125 also include information as to the interfaces supported by each class in the classes and supported interfaces 125.

The conversion system 100 also includes class implementations 145. The class implementations 145 are communicably attached to the main CPP file 135 in the COM server source code 110. The class implementations 145 provides templates for creating objects. The class implementations 145 also defines what data representations are used to represent particular attributes in objects and functions. Furthermore, the class implementations 145 captures the behavior of a function as a set of operations.

Figure 2:
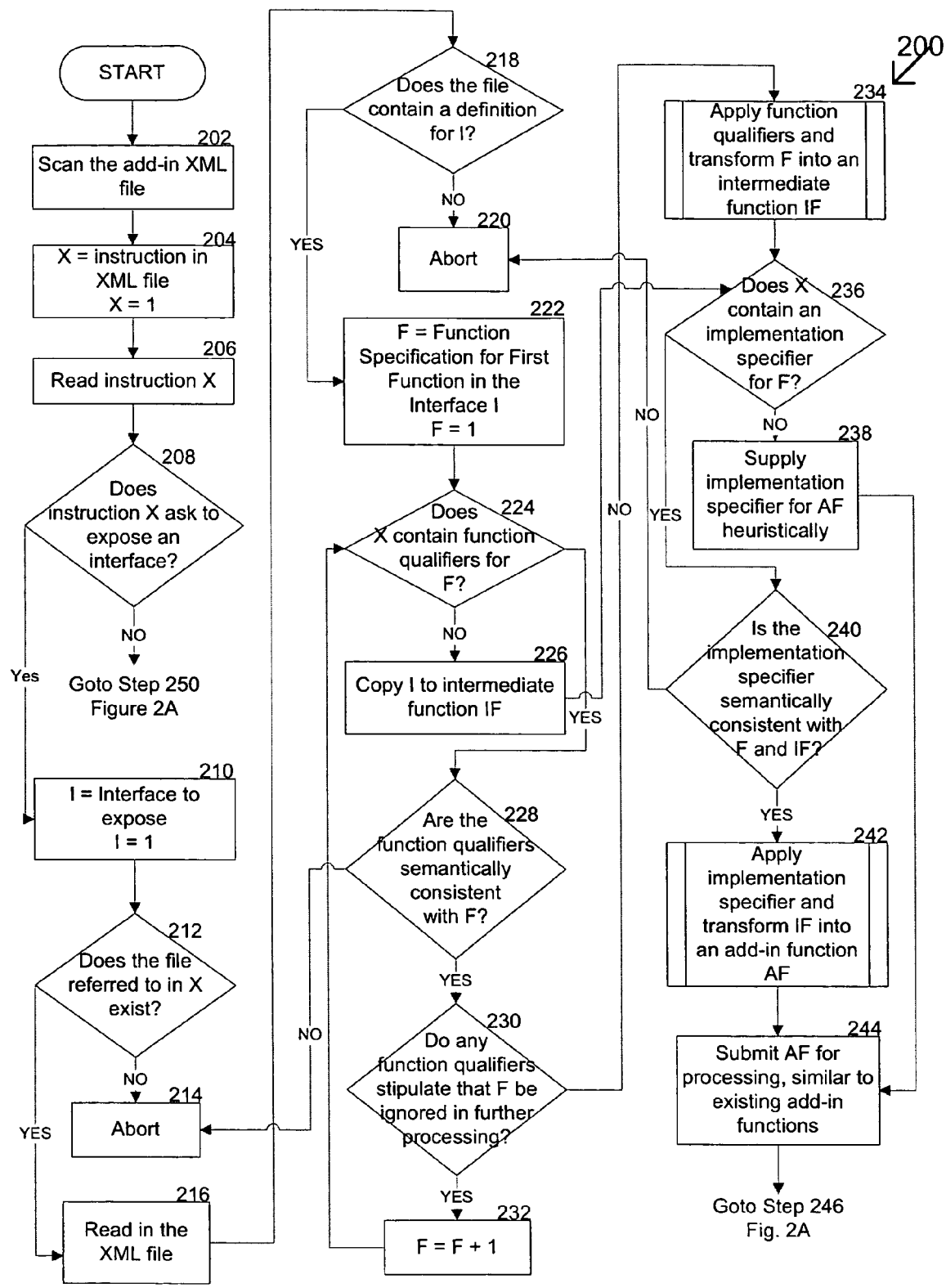
FIGS. 2 and 2A are flowcharts illustrating a process for converting XML language to an interface definition language in accordance with an exemplary embodiment of the present invention.
Figure 2A:
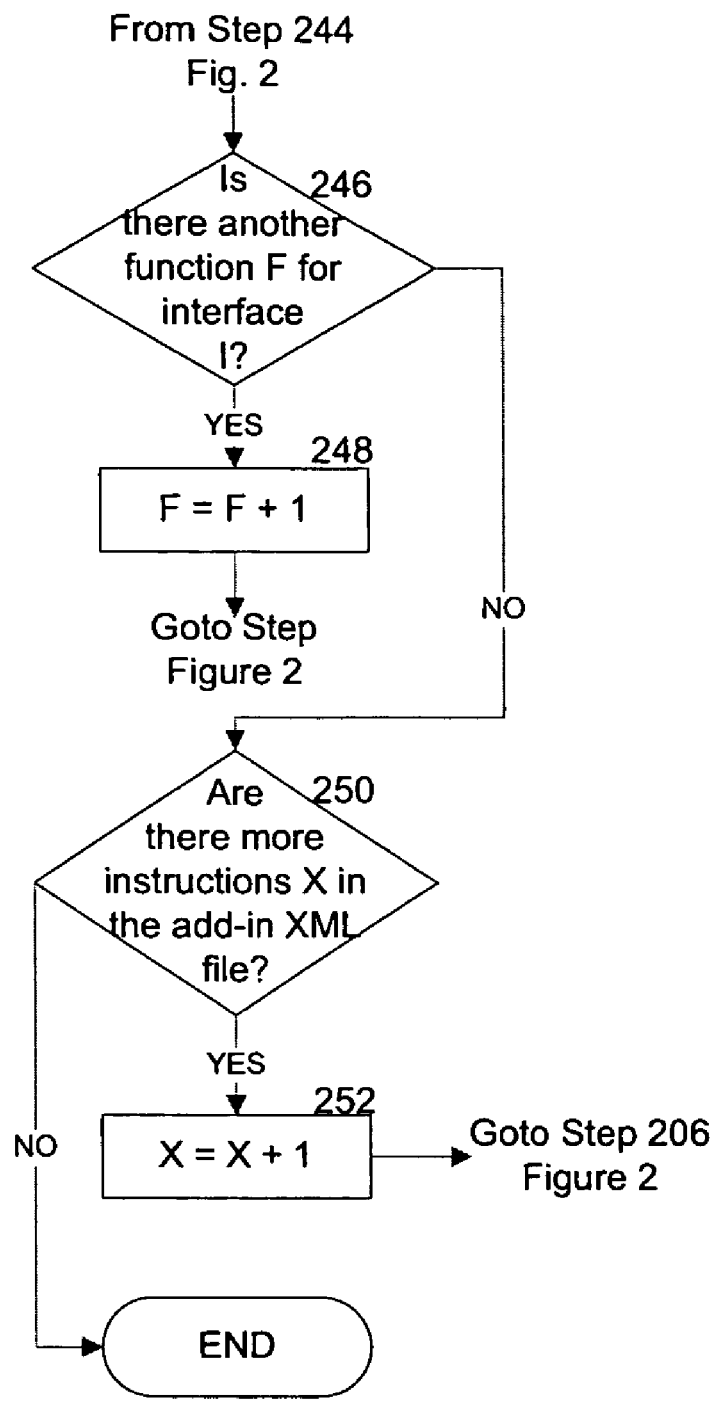

FIGS. 2 through 5 are logical flowchart diagrams illustrating the computer-implemented processes completed by exemplary methods for defining an interface between a spreadsheet application and a COM server independent of the areas that the interface is defined in accordance with one exemplary embodiment of the present invention. FIGS. 2 and 2A are logical flowchart diagrams presented to illustrate the general steps of an exemplary process 200 for defining an interface between a spreadsheet application and a COM server independent of the areas that the interface is defined within the operating environment of the conversion system 100 of FIG. 1.

Now referring to FIGS. 1, 2, and 2A, the exemplary method 200 begins at the START step and proceeds to step 202, in which the add-in XML file 117 is scanned and reviewed by the add-in source code 115 to find instructions to expose a COM interface in the add-in XML file 117. In step 204, counter variable X is set equal to one. Counter variable X represents instructions in the interface XML file 120 for exposing the COM interface. In step 206, the first instruction X is read from the interface XML file 120 by the COM server source code 110. In step 208, an inquiry is conducted by the COM server source code 110 to determine if instruction X asks to expose an interface. If instruction X does not ask to expose an interface, then the "NO" branch is followed to step 250 of FIG. 2A. Otherwise, the "YES" branch is followed to step 210, where counter variable I is set equal to one. Counter variable I represents the interface to be exposed by instruction X.

In step 212, an inquiry is conducted by the add-in code generator 119 to determine if the file referred to in instruction X in the interface XML file 120 exists among the COM class XML files 130. If the file referred to in instruction X does not exist, the "NO" branch is followed to step 214, where the conversion operation aborts and the exemplary method 200 ends. If the add-in code generator 119 determines that the file referred to in instruction X of the interface XML file 120 does exist in the COM class XML file 130, the "YES" branch is followed to step 216, where the interface XML file 120 referred to in instruction X is read by the COM server source code 110.

In step 218, an inquiry is conducted by the add-in code generator 119 to determine if the interface XML file 120 read in step 216 contains a definition for I. If not, the "NO" branch is followed to step 214, where the conversion system 100 aborts its operation and the exemplary method 200 ends. Otherwise, if the interface XML file 120 does contain a definition for I, the "YES" branch is followed to step 222, where a counter variable F is set equal to one. The counter variable F represents the function specification for the first function in the interface I.

In step 224, an inquiry is conducted by the add-in code generator 119 to determine if instruction X contains function qualifiers for the function specification F. In one exemplary embodiment, function qualifiers are located in the add-in XML file 117. The exemplary function qualifier is an instruction that can modify the function or modify the processing of the function. For example, function qualifiers can include instructions that rename function F. In addition, function qualifiers can include instructions to ignore function F and exclude it from the output of the add-in function.

If instruction X does not contain function qualifiers, then the "NO" branch is followed to step 226, where the COM server source code 110 copies the interface I to an intermediate function ("IF"). On the other hand, if instruction X does contain function qualifiers, the "YES" branch is followed to step 228. In step 228, an inquiry is conducted by the add-in code generator 119 to determine if the function qualifiers are semantically consistent with the function specification F. If the function qualifiers are not semantically consistent, the "NO" branch is followed to step 214, where the conversion system 100 aborts its operation and the exemplary method 200 ends. On the other hand, if the add-in code generator 119 determines that the function qualifiers are semantically consistent with the function specification F, then the "YES" branch is followed to step 230.

In step 230, an inquiry is conducted by the add-in code generator 119 to determine if any of the function qualifiers stipulate that the function specification F be ignored in further processing. If at least one of the function qualifiers does stipulate that the function specification F be ignored, the "YES" branch is followed to step 232, where the counter variable F is incremented by one. The process then returns to step 224. Otherwise, the "NO" branch is followed to step 234, where the COM server source code 110 applies the function qualifiers and transforms the specification into an intermediate function IF.

In step 236, an inquiry is conducted by the add-in code generator 119 to determine if instruction X contains an implementation specifier for the function specification F. The implementation specifier is located in the add-in XML file 117. In one exemplary embodiment, the implementation specifier provides an instruction in the add-in XML file 117 to override the implementation type for instruction X in the interface XML file 120. The exemplary implementation specifiers include, but are not limited to, "clone and modify," "create and define," "create and call," and "method call".

If instruction X does not contain an implementation specifier, the "NO" branch is followed to step 238, where an implementation specifier for the add-in function ("AF") is provided heuristically. The process then continues to step 244. On the other hand, if instruction X does contain an implementation specifier, the "YES" branch is followed to step 240. In step 240, an inquiry is conducted by the add-in code generator 119 to determine if the implementation specifier is semantically consistent with the function specification F and the intermediate function IF. If the implementation specifier is not semantically consistent, the "NO" branch is followed to step 214, where the conversion system 100 aborts and the exemplary method 200 ends. On the other hand, if the implementation specifier is semantically consistent with the function specification F and the intermediate function IF, the "YES" branch is followed to step 242, where the implementation specifier is applied to the intermediate function IF by the COM server source code 110 and transforms the intermediate function IF into an add-in function AF.

In step 244, the add-in function AF is submitted for processing by the spreadsheet application 105 similar to the way typical add-in functions are submitted to the spreadsheet application 105. In step 246, an inquiry is conducted by the add-in code generator 119 to determine if there is another function F for the interface I. If so, the "YES" branch is followed to step 248, where the counter variable F is incremented by one. The process then returns to step 224 of FIG. 2. If the add-in code generator 119 determines that there is not another function F for the interface I, the "NO" branch is followed to step 250. In step 250, an inquiry is conducted by the add-in code generator 119 to determine if there are additional instructions X in the add-in XML file 117. If there are additional instructions X in the add-in XML file 117, the "YES" branch is followed to step 252, where the counter variable X is incremented by one. The process then returns to step 206 of FIG. 2. If there are no additional instructions in the add-in XML file 117, the "NO" branch is followed to the END step.

Figure 3:
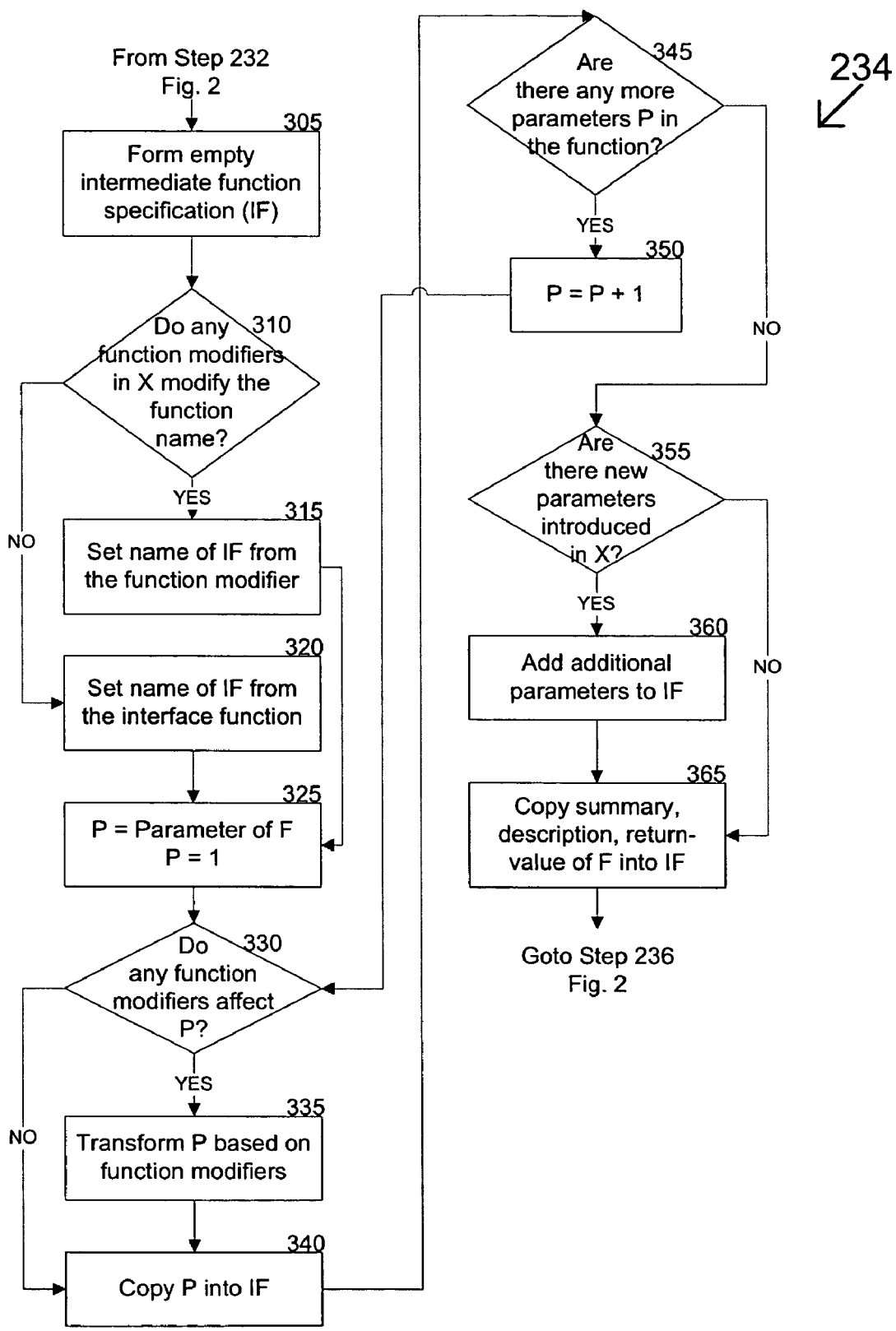
FIG. 3 is a flowchart illustrating a process for transforming functions into intermediate functions in accordance with one exemplary embodiment of the present invention.

FIG. 3 is a logical flowchart diagram illustrating an exemplary computer-implemented method for applying function qualifiers and transforming function specifications into intermediate functions as completed by step 234 of FIG. 2. Now referring to FIGS. 1, 2, and 3, the exemplary method 234 begins with the COM server source code 110 generating a form empty intermediate function specification IF in step 305. In step 310, an inquiry is conducted by the add-in code generator 119 to determine if any function modifiers in instruction X modify the function name. If so, the "YES" branch is followed to step 315, where the name of the intermediate function is set in the form intermediate function specification based on function modifiers in instruction X that modify the function name. The process then continues to step 325.

If none of the function modifiers in instruction X modify the function name, then the "NO" branch is followed to step 320, where the name of the interface function is given to the name of the form intermediate function specification. In step 325, counter variable P is set equal to one. Counter variable P represents a parameter of function specification F. In step 330, an inquiry is conducted by the add-in code generator 119 to determine if any function modifiers affect parameter P. In one exemplary embodiment, a function modifier affects parameter P by changing the parameter or by including instructions that cause parameter P to be skipped or ignored during processing by the COM server source code 110. If a function modifier affects parameter P, then the "YES" branch is followed to step 335, where the COM server source code 110 transforms parameter P based on the instructions in the function modifier. If no function modifiers effect parameter P, the "NO" branch is followed to step 340, where the COM server source code 110 copies parameter P into the form intermediate function specification.

In step 345, an inquiry is conducted by the add-in code generator 119 to determine if there are any additional parameters P in the function specification F. If there are additional parameters in the function specification F, the "YES" branch is followed to step 350, where the counter variable P is incremented by one. The process then returns to step 330. If there are no additional parameters P in the function specification F, then the "NO" branch is followed to step 355.

In step 355, an inquiry is conducted by the add-in code generator 119 to determine if there are new parameters introduced in instruction X. If there are new parameters, the "YES" branch is followed to step 360, where the COM server source code 110 adds the additional parameters to the form intermediate function specification. On the other hand, if there are no new parameters in instruction X, then the "NO" branch is followed to step 365. In step 365, the COM server source code 110 copies the summary description and return values of the function specification F into the form intermediate function specification. The process then returns to step 236 of FIG. 2.

Figure 4:
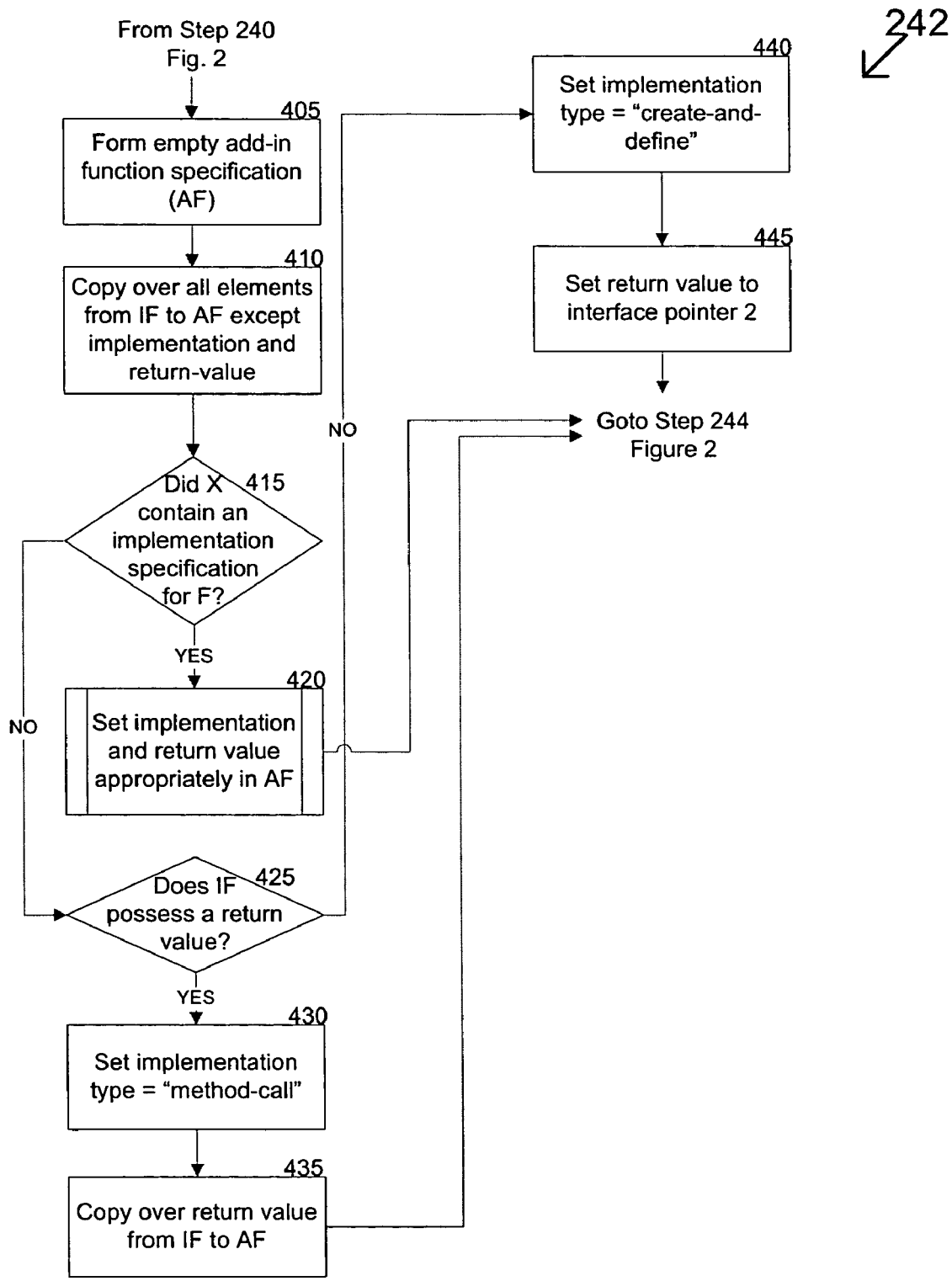
FIG. 4 is a flowchart illustrating a process for applying an implementation specifier and transforming an intermediate function into an add-in function in accordance with one exemplary embodiment of the present invention.

FIG. 4 is a logical flowchart diagram illustrating an exemplary computer-implemented method for applying the implementation specifier and transforming the intermediate function into an add-in function AF, as completed by step 242 of FIG. 2. Now referring to FIGS. 1, 2, and 4, the exemplary method 242 begins with the COM server source code 110 generating a form empty add-in function specification in step 405. In step 410, the COM server source code 110 copies over all elements from the intermediate function to the add-in function, except for the implementation specifier which is used in the subsequent steps.

In step 415, an inquiry is conducted by the add-in code generator 119 to determine if instruction X contains an implementation specification for the function specification F. If instruction X does contain an implementation specifier, the "YES" branch is followed to step 420, where the COM server source code 110 sets the implementation specifier and return values appropriately in the form add-in function specification. The process then continues to step 244 of FIG. 2. On the other hand, if instruction X does not contain an implementation specifier, the "NO" branch is followed to step 425.

In step 425, an inquiry is conducted to determine if the intermediate function possesses a return value. If the intermediate function does possess a return value, the "YES" branch is followed to step 430, where the COM server source code 110 sets the implementation type equal to "method call". In one exemplary embodiment, a "method call" function takes an existing object, makes a call on this object, and returns the value that the called object returns.

In step 435, the COM server source code 110 copies over the return value from the intermediate function IF to the form add-in function specification. The process then continues to step 244 of FIG. 2. On the other hand, if the intermediate function IF does not possess a return value, the "NO" branch is followed to step 440, where the implementation type is set by the COM server source code 110 as "create and define". In one exemplary embodiment, a "create and define" function creates an object and then defines the object. In step 445, the COM server source code 110 sets the return value to interface pointer. The process then returns to step 244 of FIG. 2.

Figure 5:
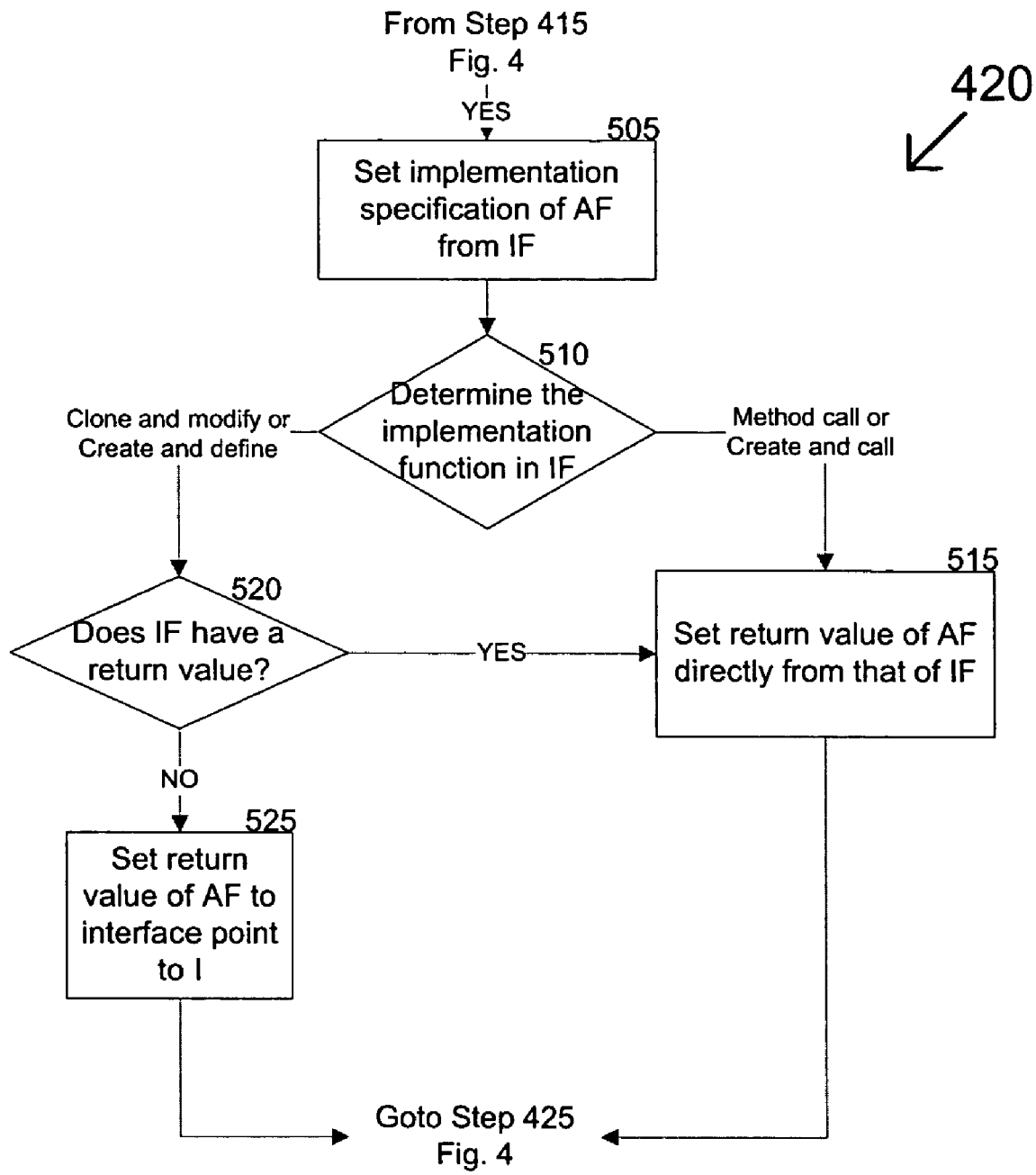
FIG. 5 is a flowchart illustrating a process for setting the implementation and return values in an add-in function in accordance with one exemplary embodiment of the present invention.

FIG. 5 is a logical flowchart diagram illustrating an exemplary computer-implemented method for setting the implementation and return values in the add-in function, as completed by step 420 of FIG. 4. Now referring to FIGS. 1, 2, 4, and 5, the exemplary method 420 begins with the COM server source code 110 setting the implementation specification of the form add-in function specification from the intermediate function IF in step 505. In step 510, an inquiry is conducted by the add-in code generator 119 to determine the implementation function in the intermediate function IF. If the implementation function is "clone and modify" or "create and define", the "clone and modify or create and define" branch is followed to step 520. In one exemplary embodiment, the "clone and modify" implementation function creates a copy of the object, clones it, and then calls a method on the new that modifies its state.

In step 520, an inquiry is conducted by the add-in code generator 119 to determine if the intermediate function IF has a return value. If the intermediate function does not have a return value, the "NO" branch is followed to step 525, where the COM server source code 110 sets the return value of the form add-in function specification to the interface point of the interface XML file 120. The process then returns to step 425 of FIG. 4. Returning to step 510, if the implementation function is a "method call" or a "create and call" the "method call or create and call" branch is followed to step 515. In one exemplary embodiment, the "create and call" implementation function creates an instance of a stateless object and then calls a method on it. The "create and call function is typically used when the class is a group of related functions. In step 515, the COM server source code 110 sets the return value of the form add-in function specification directly from the return value of the intermediate function IF. The process then returns to step 425 of FIG. 4.

In conclusion, the present invention supports a computer-implemented method for defining an interface between a spreadsheet application and a COM server independent of the areas that the interface is defined. In support of defining the interface, an add-in function defines the interface using extensible markup language ("XML"). It will be appreciated that the present invention fulfills the needs of the prior art described herein and meets the above-stated objectives. While there have been shown and described several exemplary embodiments of the present invention, it will be evident to those skilled in the art that various modifications and changes may be made thereto without departing from the spirit and the scope of the present invention as set forth in the appended claims and equivalences thereof.

We claim:

1. A computer-implemented method for transforming an XML file into an add-in function for use in a spreadsheet application comprising:
   scanning an add-in XML file for an instruction;
   determining an interface XML file to be exposed by the instruction;
   accepting the interface XML file from a COM server;
   determining if the instruction comprises a function qualifier; wherein the function qualifier modifies a function specification in the interface XML file;
   applying the function qualifier to the function specification;
   converting the function specification to an intermediate function;
   applying an implementation specifier to the intermediate function, wherein the implementation specifier overrides the default implementation of the interface XML file;
   converting the intermediate function to an add-in function; and
   transmitting the add-in function to the spreadsheet application for processing.

2. The computer-implemented method of claim 1, wherein applying the function qualifier to the function specification further comprises the steps of:
   generating an empty form intermediate function;
   applying a name to the form intermediate function;
   transferring at least one parameter of the function from the interface XML file to the form intermediate function;
   determining if the instruction in the add-in XML file comprises additional parameters to be included in the form intermediate function;
   adding the additional parameters from the instruction to the form intermediate function if the instruction comprises additional parameters; and
   adding the a function summary, function description, and function return-value from the function specification to the form intermediate function thereby creating the intermediate function.

3. The computer-implemented method of claim 2, further comprising the steps of:
   accepting a function modifier from the instruction in the add-in XML file;
   determining if the function modifier comprises instructions to modify a name of the add-in function; and
   setting a name of the intermediate function based on the instructions in the function modifier based on a positive determination.

4. The computer-implemented method of claim 3, further comprising the steps of:

determining if the function modifier comprises instructions to modify the parameter of the function specification;

modifying the parameter based on the instruction in the function modifier based on a positive determination;

adding the modified parameter into the form intermediate function;

determining if the function specification comprises additional parameters; and accepting the additional parameters to determine if the function modifier comprises instructions to modify the additional parameters.

5. The computer-implemented method of claim 1, wherein applying the implementation specifier to the intermediate function further comprises the steps of:

generating an empty form add-in function;

transferring at least one attribute from the intermediate function to the form add-in function, wherein the attribute comprises all elements in the intermediate function other than an implementation and return value attribute of the intermediate function;

determining if the instruction comprises an implementation specifier for the function specification;

formatting implementation and return value attributes of the form add-in function based on the implementation specifier in the instruction; and converting the form add-in function to the add-in function.

6. The computer-implemented method of claim 5, wherein formatting the implementation and return value attributes further comprises the steps of:

determining the implementation in the intermediate function;

adding the implementation from the intermediate function to the form add-in function;

setting the return value of the form add-in function to be the same as the return value of the intermediate function if the implementation is of a group consisting of a method call or a create and call;

determining if the intermediate function comprises a return value if the implementation in the intermediate function is of a group consisting of clone and modify or create and define;

setting the return value of the form add-in function to be the same as the return value of the intermediate function if the intermediate function comprises a return value; and setting the return value in the form add-in function to an interface pointer in the interface XML file.

7. The computer-implemented method of claim 1, further comprising the step of copying the interface XML file to the intermediate function if the instruction does not comprise the function qualifier.

8. The computer-implemented method of claim 1, further comprising the steps of:

determining if the function qualifier is semantically consistent with the function specification;

determining if the function qualifier instructs that the function specification be ignored; and accepting another function specification for analysis against the function qualifier.

9. The computer-implemented method of claim 1, further comprising the steps of:

determining if the instruction comprises an implementation specifier for the function specification;

determining if the implementation specifier is semantically consistent with the function specification and the intermediate function if the instruction comprises and implementation specifier; and determining the implementation specifier for the add-in function if the instruction does not comprise an implementation specifier.

10. The computer-implemented method of claim 9, wherein determining the implementation specifier for the add-in function further comprises the steps of:

determining if the function specification comprises a return value;

inputting a method call as the implementation specifier for the intermediate function if the function specification comprises a return value; and inputting create and define as the implementation specifier for the intermediate function if the function specifier does not comprise a return value.

11. The computer-implemented method of claim 1, further comprising the steps of:

determining if there is another function specification for the interface XML file;

accepting another function specification for the interface XML file based on a positive determination;

determining if the add-in XML file comprises another instruction based on the determination that this is not another function specification for the interface XML file; and accepting another instruction from the add-in XML file.

12. A computer-implemented method for transforming an XML file into an add-in function for use in a spreadsheet application comprising:

scanning an add-in XML file for an instruction from a plug-in file;

determining an interface XML file to be exposed by the instruction by verifying that the interface XML file identified in the instruction is accessible from a COM server;

accepting the interface XML file comprising an interface from the COM server;

determining if the instruction comprises a function qualifier; wherein the function qualifier modifies a function specification in the interface XML file;

copying the interface to a form intermediate function based on a negative determination that the instruction comprises a function qualifier converting the function specification to an intermediate function;

applying an implementation specifier to the intermediate function, wherein the implementation specifier overrides the default implementation of the interface XML file;

converting the intermediate function to an add-in function; and transmitting the add-in function to the spreadsheet application for processing.

13. The computer-implemented method of claim 12, wherein applying the implementation specifier to the intermediate function further comprises the steps of:

generating an empty form add-in function;

transferring at least one attribute from the intermediate function to the form add-in function, wherein the attribute comprises all elements in the intermediate function other than an implementation and return value attribute of the intermediate function;

determining if the instruction comprises an implementation specifier for the function specification;

formatting implementation and return value attributes of the form add-in function based on the implementation specifier in the instruction; and converting the form add-in function to the add-in function.

14. The computer-implemented method of claim 13, wherein formatting the implementation and return value attributes further comprises the steps of:
- determining the implementation in the intermediate function;
- adding the implementation from the intermediate function to the form add-in function;
- setting the return value of the form add-in function to be the same as the return value of the intermediate function if the implementation is of a group consisting of a method call or a create and call;
- determining if the intermediate function comprises a return value if the implementation in the intermediate function is of a group consisting of clone and modify or create and define;
- setting the return value of the form add-in function to be the same as the return value of the intermediate function if the intermediate function comprises a return value; and
- setting the return value in the form add-in function to an interface pointer in the interface XML file.

15. The computer-implemented method of claim 12, further comprising the steps of:
- determining if the instruction comprises an implementation specifier for the function specification;
- determining if the implementation specifier is semantically consistent with the function specification and the intermediate function if the instruction comprises and implementation specifier; and
- determining the implementation specifier for the add-in function if the instruction does not comprise an implementation specifier.

16. The computer-implemented method of claim 15, wherein determining the implementation specifier for the add-in function further comprises the steps of:
- determining if the function specification comprises a return value;
- inputting a method call as the implementation specifier for the intermediate function if the function specification comprises a return value; and
- inputting create and define as the implementation specifier for the intermediate function if the function specifier does not comprise a return value.

17. The computer-implemented method of claim 12, further comprising the steps of:
- determining if there is another function specification for the interface XML file;
- accepting another function specification for the interface XML file based on a positive determination;
- determining if the add-in XML file comprises another instruction based on the determination that this is not another function specification for the interface XML file; and
- accepting another instruction from the add-in XML file.

18. A computer-implemented method for transforming an XML file into an add-in function for use in a spreadsheet application comprising:
- scanning an add-in XML file for an instruction;
- determining an interface XML file to be exposed by the instruction;
- accepting the interface XML file from a COM server;
- determining if the instruction comprises a function qualifier; wherein the function qualifier modifies a function specification in the interface XML file;
- applying the function qualifier to the function specification;
- converting the function specification to an intermediate function;
- determining if the instruction comprises an implementation specifier for the function specification, wherein the implementation specifier overrides the default implementation of the interface XML file;
- determining the implementation specifier for the add-in function if the instruction does not comprise an implementation specifier;
- applying an implementation specifier to the intermediate function;
- converting the intermediate function to an add-in function; and
- transmitting the add-in function to the spreadsheet application for processing.

19. The computer-implemented method of claim 18, wherein applying the function qualifier to the function specification further comprises the steps of:
- generating an empty form intermediate function;
- accepting a function modifier from the instruction in the add-in XML file;
- determining if the function modifier comprises instructions to modify a name of the add-in function;
- setting a name of the form intermediate function based on the instructions in the function modifier based on a positive determination;
- transferring at least one parameter of the function from the interface XML file to the form intermediate function;
- determining if the instruction in the add-in XML file comprises additional parameters to be included in the form intermediate function;
- adding the additional parameters from the instruction to the form intermediate function if the instruction comprises additional parameters; and
- adding the a function summary, function description, and function return-value from the function specification to the form intermediate function thereby creating the intermediate function.

20. The computer-implemented method of claim 19, further comprising the steps of:
- determining if the function modifier comprises instructions to modify the parameter of the function specification;
- modifying the parameter based on the instruction in the function modifier based on a positive determination;
- adding the modified parameter into the form intermediate function;
- determining if the function specification comprises additional parameters; and
- accepting the additional parameters to determine if the function modifier comprises instructions to modify the additional parameters.

21. The computer-implemented method of claim 18, wherein applying the implementation specifier to the intermediate function further comprises the steps of:
- generating an empty form add-in function;
- transferring at least one attribute from the intermediate function to the form add-in function, wherein the attribute comprises all elements in the intermediate function other than an implementation and return value attribute of the intermediate function;
- determining if the instruction comprises an implementation specifier for the function specification;
- formatting implementation and return value attributes of the form add-in function based on the implementation specifier in the instruction; and
- converting the form add-in function to the add-in function.

22. The computer-implemented method of claim 21, wherein formatting the implementation and return value attributes further comprises the steps of:
- determining the implementation in the intermediate function;
- adding the implementation from the intermediate function to the form add-in function;
- setting the return value of the form add-in function to be the same as the return value of the intermediate function if the implementation is of a group consisting of a method call or a create and call;
- determining if the intermediate function comprises a return value if the implementation in the intermediate function is of a group consisting of clone and modify or create and define;
- setting the return value of the form add-in function to be the same as the return value of the intermediate function if the intermediate function comprises a return value; and setting the return value in the form add-in function to an interface pointer in the interface XML file.

23. The computer-implemented method of claim 18, further comprising the step of copying the interface XML file to the intermediate function if the instruction does not comprise the function qualifier.

24. The computer-implemented method of claim 18, wherein determining the implementation specifier for the add-in function further comprises the steps of:
- determining if the function specification comprises a return value;
- inputting a method call as the implementation specifier in the form intermediate function if the function specification comprises a return value; and
- inputting create and define as the implementation specifier in the form intermediate function if the function specifier does not comprise a return value.

* * * * *